INVENTOR.
FRANK A. BUTRICO
BY
ATTORNEY

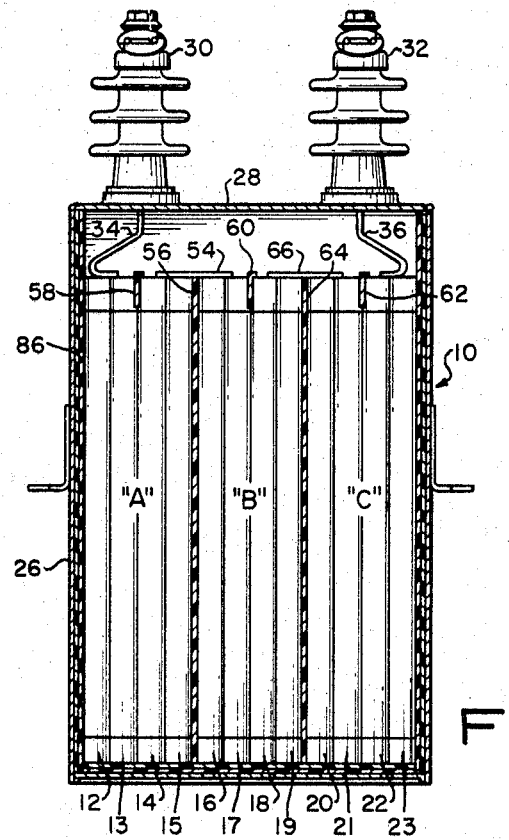
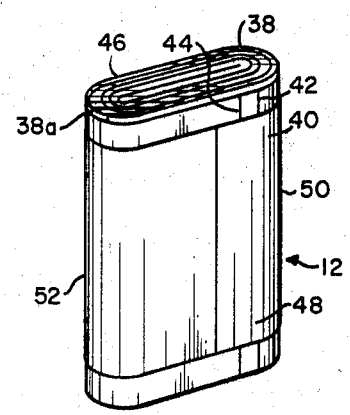
FIG. 1
FIG. 2
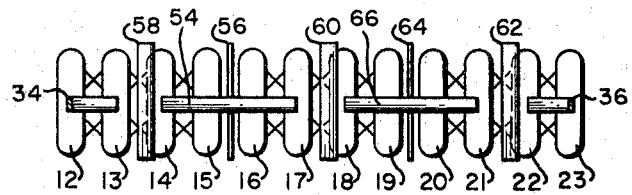
FIG. 4
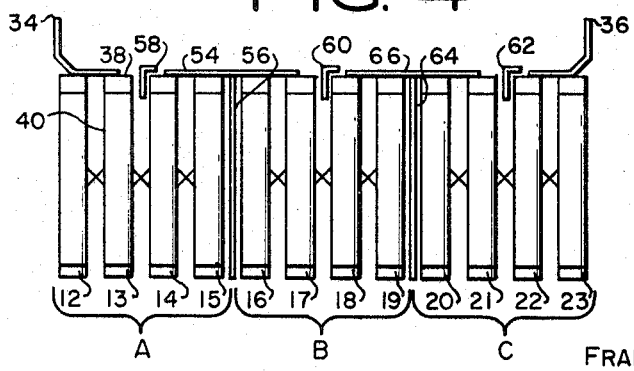
FIG. 3
INVENTOR.
FRANK A. BUTRICO
BY
ATTORNEY

United States Patent Office 3,441,816
Patented Apr. 29, 1969

3,441,816
MULTISECTION POWER FACTOR CORRECTION CAPACITOR
Frank A. Butrico, South Plainfield, N.J., assignor to Federal Pacific Electric Company, a corporation of Delaware
Filed Apr. 5, 1967, Ser. No. 628,699
Int. Cl. H01g 1/08
U.S. Cl. 317—243                                11 Claims

ABSTRACT OF THE DISCLOSURE

A power capacitor made of a plurality of capacitor units in a case connected in series and parallel arrangement. Each unit contains a plurality of sections. The sections within the units are made up of wound capacitors having an exposed electrode on the outside of the section for electrical connection and another electrode with an extending foil portion for connection.

---

This invention relates to power factor correcting capacitors for electrical power systems and more particularly to power factor capacitors having improved temperature operating characteristics.

Power factor correcting capacitors are widely used to improve the power factor on a normally inductive transmission line, to thereby reduce line losses and to minimize voltage drops on such transmission lines. The beneficial results of employing such capacitors has been widely recognized and they are used in large banks. With increased use there has come a demand for increased reactive effect without increasing the dimensions of the capacitors. The required increase in unit rating without an accompanying increase in the surface area resulted in problems of shorter life due to dielectric failure due to increased temperatures within the capacitor unit.

Conventional power factor capacitors comprise a plurality of wound capacitor sections which are interconnected to provide the desired capacitance at the rated voltage. Each capacitor section is composed of convolutely wound metallic foil electrodes and dielectric paper separators. The sections are positioned within a container and, during the manufacturing process, they are impregnated with the dielectric liquid which fills the tank. The sections within the tank are isolated from the container by a "major insulation" layer. The major insulation may comprise multiple sheets of a heavier "capacitor grade" paper.

It is an object of this invention to provide a power factor correction capacitor having an improved construction which provides a higher kilovar capacity within a given container size without a deleterious increase in operating temperature.

It is another object of this invention to provide an improved method of manufacturing power factor correction capacitors which produce capacitors having minimized electrical and mechanical stresses therein.

It is still another object of this invention to provide a power-factor correction capacitor having a simplified interconnection arrangement between the wound sections therein.

It is yet another object of this invention to provide a power factor correction capacitor composed of multiple wound sections arranged in series and parallel connections with a minimized number of connector elements.

Briefly, in one aspect of the invention there is provided a power factor correction capacitor which includes a plurality of wound sections connected in series and parallel. Each of the sections includes convolutely wound electrode foils and dielectric layers. One of the foils is extended longitudinally beyond one end of the wound section and is margined at the other end thereof, i.e., terminates short of the other end of the wound section. Another of the foils is margined at both longitudinal ends of the wound section and is longer than the wound dielectric strip so that multiple turns of this electrode are wound about the section at its lateral surface. The extended foil and the lateral foil provide the terminals for the section. In one embodiment of the invention the wound sections are serially arrayed in pairs of sections. The wound capacitor sections are held with their lateral foils in electrical and mechanical engagement with the corresponding lateral foil of at least one adjacent section. Where two pairs of sections are used the lateral foils connect the wound sections of the first pair in parallel, the wound sections of the second pair in parallel and also connect the first and second pairs in series. The extended foils are utilized to connect the sections together, i.e., in this situation the extended foils of the sections of the first pair are connected together and the extended foils of the second pair are connected together. In this mode the extended foils are the terminals of the series/parallel arrangement of sections.

The above and other objects and advantages, novel features of the invention, will become apparent to those skilled in the art from the following detailed description when taken in conjunction with the accompanying drawing in which:

FIG. 1 is a front elevation of a power factor correction capacitor with the side of the container removed to show the arrangement of the capacitor sections in the container;

FIG. 2 is a perspective view of a wound capacitor section;

FIG. 3 is an exploded schematic representation of the front elevation of the capacitor of FIG. 1 to illustrate the mode of interconnection between the wound sections;

FIG. 4 is a plan view according to FIG. 3;

Figure 5:
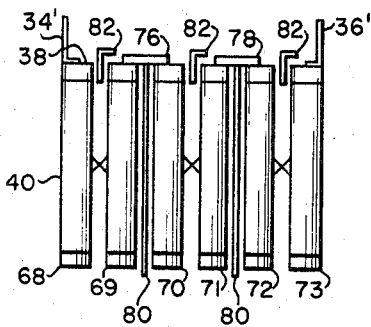
FIG. 5 is a view similar to FIG. 3 of yet another embodiment of the invention.

Referring to FIG. 1 there is illustrated a power factor capacitor 10 which includes a plurality of wound capacitor sections 12–23 and a metal container 26. The container is hermetically sealed by a cover 28 which carries two terminal bushings 30, 32 that are connected to the arrayed capacitor sections by conductor strips 34, 36. For purposes of clarity, other capacitor components such as resistors, etc., have been omitted. Capacitor 10 is filled with, and the capacitor sections are impregnated by, a well-known liquid dielectric such as "Aroclor."

The wound capacitor sections are identical, and are illustrated in greater detail by the representative section 12 shown in FIG. 2. Capacitor section 12 includes a pair of electrodes in the form of a layer of metal foil 38 and a layer of metal foil 40. Layers 42, 44 of dielectric material, such as capacitor paper, are interposed between the foils 38, 40. The layers of foil and paper are rolled together on a mandrel on a standard capacitor winding machine to form a cylindrical roll which is subsequently flattened to provide flattened opposed lateral faces 46, 48 connected by curved end faces 50, 52. Foil 38 is shifted longitudinally of the axis of section 12 so that it has a portion 38a that extends beyond one end of the section and, at its other edge within the roll, it is spaced inwardly from the end of the section to provide a "margined" area. Foil 40 is narrower than the dielectric layers 42, 44 which are of substantially equal width and is approximately centered on the section leaving "margined" areas at both ends of the section. During the winding operation which produces the roll, the foil 38 which has the "extended" portion 38a (hereinafter referred to as extended foil 38) is terminated first, next the dielectric layers 42, 44 are terminated and then, after multiple turns of foil 40 are placed around the section, it is terminated. The extended foil 38 forms one terminal of the capacitor section 12 and the superposed multiple turns of the foil 40 on the exterior section 12 form the other terminal. The multiple turns of foil 40 and the extended foil 38 act as low thermal resistance paths for the internal heat generated by losses in the capacitor during operation. The avoidance of "tap-type" connecting straps reduces the mechanical stresses applied to the dielectric. Further, possible deleterious effects due to plating migration etc., from the use of taps at high voltages are also obviated.

A typical, finished capacitor section 12 fabricated according to the teaching of this invention would have a rating of 7.68 mfd. at a voltage rating of 1200–1800 volts at 60 Hz. In order to provide a completed power factor correction capacitor rated at 50 kvar. at 7200 volts at 60 Hz. it is necessary to connect the sections 12–23 in a series/parallel arrangement. The connection mode will be discussed in detail since it is particularly advantageous in that no tap straps are employed in making the required connections to the electrodes 38 and 40. As will also be seen, the connections which must be made to the sections may be made at the upper end of the sections after they are compressed and installed in the container 26. As explained above the foil 40, which forms one terminal of the sections is exposed at the lateral faces 46, 48 of the section. By placing the lateral faces of selected ones of the sections against each other to be in contact with the corresponding lateral faces of adjacent sections, their lateral foils 40 are electrically connected. Plural groups of sections 12 may be utilized wherein each group includes one or more sections. In the embodiment of the invention illustrated in FIGS. 1–4 pairs of sections such as 12–13 and 14–15 are connected in parallel within their group by the engagement of their lateral foils 40 on the surfaces between the sections. The groups 12–13, 14–15 are connected in series by the engagement of the lateral foils 40 of the sections 13 and 14. The extended foils 38 of sections 12–13 are interconnected by a portion 34 of the terminal lead 34 while the extended foils 38 of sections 14–15 are connected by a bridging member 54. Bridging member 54 is also connected to the extended foils of the next adjacent group comprising the pair of sections 16–17. A full length layer of insulation 56, sufficient to withstand the section voltage, is interposed between the lateral foils 40 of sections 15–16 to electrically isolate the foils from one another. The bridging member 54 provides the only electrical path between paralleled sections 14–15 and similarly paralleled sections 16–17 so that the pairs 14–15 and 16–17 are connected in series thereby. A short length layer of insulation 58, sufficient to withstand the section voltage, is interposed between sections 13–14 to insulate the extended foils from one another to thereby assure that their lateral foils 40 form their only electrical connection. The connection scheme outlined above is repeated with a short length layer of insulation 60, 62 between the extended foils of sections 17–18 and sections 21–22, a full length layer of insulation 64 between the lateral foils 40 of sections 19–20 and a bridging member 66 between the extended foils 38 of sections 18, 19, 20 and 21. In this manner the sections 12–13, while serially arrayed, are divided into three units "A," "B," "C" of four by separator layers of insulation 56, 64. The sections within the group are connected by their respective foils while the groups are connected by the bridging members 54, 66. To further illustrate the method of connecting the sections 12–23 reference is made to FIGS. 3 and 4, which are exploded views of the capacitor of FIG. 1. For illustrative reasons the connections between the lateral foils 40 of the sections are illustrated by an X. It will be understood by those skilled in the art that the connection is made on the full lateral face of the sections. In summary the connection mode within the group "A" comprising sections 12–15 is as follows:

Sections 12 and 13 are connected in parallel by conductor 34 that bridges their extended foils 38 and the contact between their lateral foils 40.

The pairs of capacitor sections 12–13 and 14–15 are connected in series by the contact between the lateral foils 40 of sections 13 and 14.

This connection scheme is repeated for groups "B" and "C" with the bridging members 54 and 66 functioning to connect the groups in series.

Referring to FIG. 5, there is illustrated another embodiment of the invention. Here the sections 68–73, which are of the same construction as section 12 discussed above, are connected as a series capacitor. Sections 68 and 69 are connected in series by the contact of their lateral foils 40 as are sections 70–71 and 72–73. The extended foils 38 of sections 69–70 and 71–72 are connected by bridging connectors 76, 78 respectively while their lateral foils are insulated by full length separators 80. Short length insulators 82 are interposed between the extended foils of sections 68–69, 70–71 and 72–73. The series connected array of sections 68–73 may be connected to the capacitor terminals, not shown, by conductors 34' and 36' which are connected to the extended foils 38 of the first and last sections 68 and 73.

Figure 6:
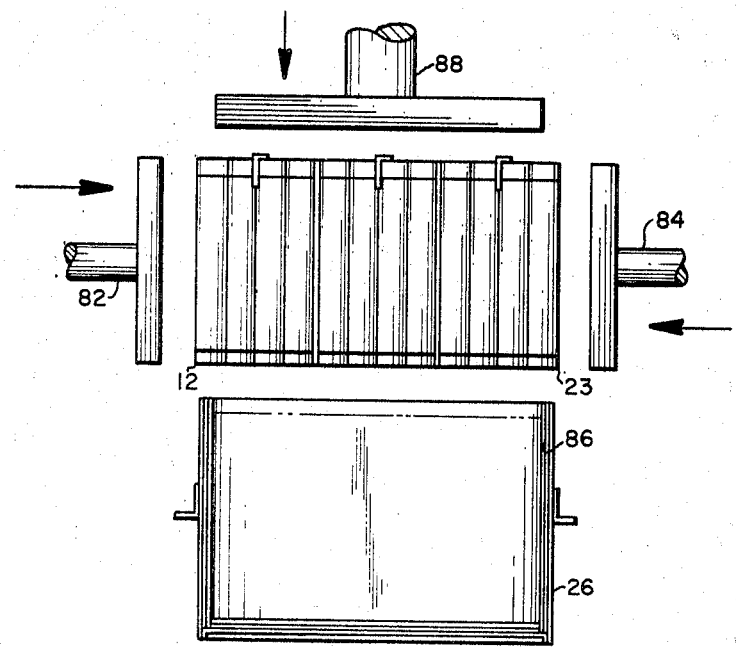
FIG. 6 is a pictorial representation of a portion of the method of assembling the improved power factor correction capacitors described herein.

In producing capacitors 10 according to a further feature of the invention the flattened, although not compressed, sections are stacked in a jig with the short and long insulation members interposed in proper sequence as illustrated in FIG. 6. Pressure as by a pair of opposed rams 82, 84 is then applied to compact the stack of sections to a substantially solid condition. It should be noted that the absence of tap straps allows the necessary high compression force to be applied to the stack without wrinkling or otherwise adversely affecting the dielectric paper or the foils. Where tap straps were used the degree of compression was limited by their presence. The avoidance of tap stresses provides a capacitor having greatly improved operating charactristics such as ability to operate at a higher section voltage. The compressed stack is inserted into the container 26, which has been previously lined with the major insulation 86 that is capable of withstanding the rated voltage of the capacitor 88. The sections are held against expansion, at approximately 92% of the solid state, by the container 26. Subsequently, bridging members 54, 66 are attached to the extended foils 38a, overlaying the insulators 56, 64 by well-known means such as soldering or swaging. The terminal leads 34 and 36 which extend to the bushings 30, 32 are then secured to the respective capacitor sections. The cover, which has subsequently sealed port, not shown, is then secured to the container and the capacitor is then processed through a vacuum drying and impregnating cycle as is well known in the art. Capacitors fabricated according to the teaching of this invention need only have connections made at the upper surface of the units after they are assembled in their container. The use of retaining straps about the stack, which can also cause wrinkling of the sections, is thus avoided. Further, the end capacitor sections firmly engage the walls of the containers for increased heat dissipation.

Although several embodiments of the invention in its various aspects have been shown and described in detail, it will be recognized by those skilled in the art that various changes and modifications may be made therein without departing from the spirit and scope of the invention.

What I claim is:

1. A multisection capacitor free of terminal tap straps, including plural wound and flattened capacitor sections stacked laterally, each said wound and flattened section comprising an extended-foil winding providing the capacitor section with an end terminal and further comprising a margined foil winding having an external portion extending laterally about the capacitor section and forming a lateral terminal, at least two adjacent ones of said stacked capacitor sections being connected together at their external lateral terminals, and respective connections to the end terminals of said two adjacent capacitor sections, whereby said capacitor sections are connected in series.

2. A multisection capacitor in accordance with claim 1 wherein said stacked capacitor sections include at least one additional capacitor section adjacent to each one of said adjacent two capacitor sections and therewith forming a first group and a second group of at least two capacitor sections in each group, the lateral terminal portions of all said capacitor sections being connected together, and means connecting the end terminals of each group of capacitor sections together, whereby said capacitor includes at least two groups of capacitor sections connected in series, the capacitor sections of each group being connected in parallel.

3. A multisection capacitor in accordance with claim 1, wherein said end terminals are laterally adjacent each other, further including insulating means interposed between the end terminals of said adjacent two capacitor sections.

4. A multisection capacitor in accordance with claim 1, wherein said stacked capacitor sections include said two capacitor sections and a third capacitor section, lateral insulating means interposed between said third capacitor section and said two capacitor sections, one of said end-terminal connections being connected to the end terminal of said third capacitor section.

5. A multisection capacitor in accordance with claim 1, wherein said adjacent capacitor sections form a first unit of series-connected capacitor sections, said laterally stacked capacitor sections including a further like unit of series-connected capacitor sections adjacent to said first unit, a bridging connection between an end terminal of a capacitor section of one of said units and an end terminal of a capacitor section of the adjacent unit, and an insulating sparator between the external lateral terminals of the adjacent capacitor sections of said adjacent units.

6. A multisection capacitor in accordance with claim 5, wherein all said end terminals are aligned at one end of the stacked capacitor sections, and wherein insulating means is interposed between the end terminals of adjacent capacitor sections which are series-connected at their lateral terminals.

7. A multisection capacitor in accordance with claim 2, wherein said stacked capacitor sections include a series-parallel unit of first and second series-connected groups of at least two parallel-connected capacitor sections per group, said stack of capacitor sections including a further like series-parallel unit adjacent said first unit and laterally separated therefrom by interposed insulation, the end terminals of one group of capacitor sections in one unit being connected to the end terminals of one group of capacitor sections of said further unit.

8. A multisection capacitor in accordance with claim 2 wherein said stacked capacitor sections include at least four capacitor sections forming a series-parallel unit of first and second series-connected groups of at least two parallel-connected capacitor sections per group, and said stack of capacitor sections include a further series-parallel unit adjacent said first unit and laterally separated therefrom by interposed insulation, connections between respective end terminals of said units being connected together to connect said units in series, all said end terminals being aligned and the connections to and between the end terminals all being at one end of the stacked capacitor sections, and insulating means interposed between the adjacent end terminals of those capacitor sections which are series-connected at their lateral terminals, and a container enclosing said stacked capacitor sections, said container having a cover over the aligned end terminals of the capacitor sections.

9. A multisection capacitor in accordance with claim 2, further including an internally insulated metal container, said stacked flattened capacitor sections having their flattened lateral surfaces confronting each other in succession and the narrow lateral surfaces of said capacitor sections being in close heat-transfer relation to said container, each of said margined foil windings comprising a multiplicity of face-to-face convolutions for promoting heat transfer from all parts of the flattened lateral surfaces of said sections to said narrow lateral surfaces and to said container.

10. A multisection capacitor in accordance with claim 2 wherein said stacked capacitor sections include at least four capacitor sections forming a series-parallel unit of first and second series-connected groups of at least two parallel-connected capacitor sections per group, and said stack of capacitor sections include a first series-parallel unit adjacent said first unit and laterally separated therefrom by interposed insulation, connections between respective end terminals of said units being connected together to connect said units in series, an internally insulated metal container, said stacked flattened capacitor sections having their flattened lateral surfaces confronting each other in succession and the narrow lateral surfaces of said capacitor sections being in close heat-transfer relation to said container, each of said margined foil windings comprising a multiplicity of face-to-face convolutions for promoting heat transfer from all parts of the flattened lateral surfaces of said sections to said narrow lateral surfaces and to said container.

11. The method of manufacturing a capacitor in accordance with claim 8, including the steps of assembling said capacitor sections and said interposed insulation as a stack with the end terminals aligned, compressing said stack and forcibly inserting said stack into a tight-fitting casing, and making the connections between the end terminals of the sections of each group and the series connections between said series-parallel units, sealing a cover to said casing, and impregnating the contents of the casing.

References Cited

UNITED STATES PATENTS

| | | |
|---|---|---|
| 2,922,937 | 1/1960 | Hutzler. |
| 2,933,664 | 4/1960 | Linderholm _____ 317—260 X |
| 3,024,393 | 3/1962 | Ferrante _____ 317—242 |
| 3,254,281 | 5/1966 | McClain _____ 317—260 X |

FOREIGN PATENTS 478,883  11/1951  Canada.

DARRELL L. CLAY, *Primary Examiner.*

E. A. GOLDBERG, *Assistant Examiner.*

U.S. Cl. X.R.

29—25.42; 317—260